C. O. WILDER.
LIFTING DEVICE FOR DROP-HAMMERS.
No. 171,458. Patented Dec. 21, 1875.
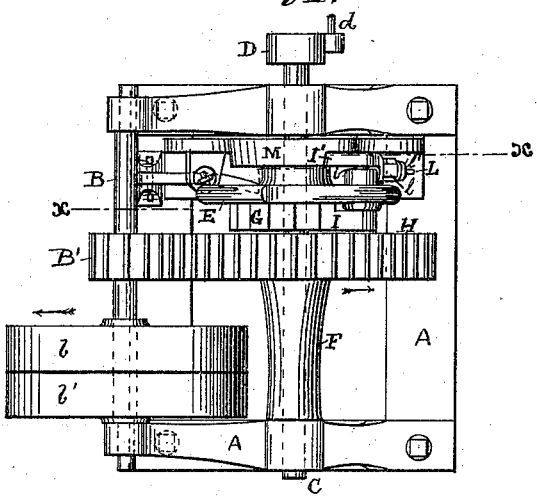
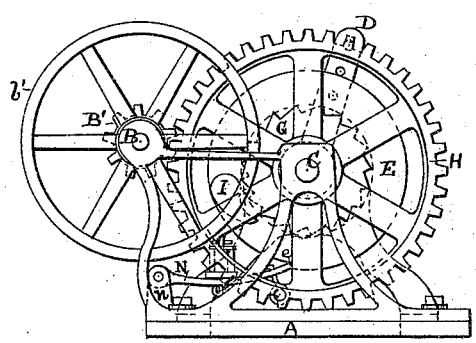
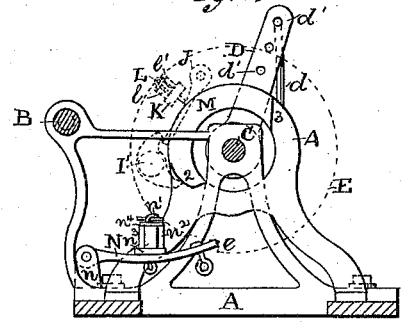
Witnesses
D. G. Stuart
L. Hannay
Inventor.
Charles O. Wilder.
By W. B. Richards & A. McCallum
Attys

UNITED STATES PATENT OFFICE.

CHARLES O. WILDER, OF CHICAGO, ILLINOIS.

IMPROVEMENT IN LIFTING DEVICES FOR DROP-HAMMERS.

Specification forming part of Letters Patent No. 171,458, dated December 21, 1875; application filed November 3, 1875.

*To all whom it may concern:*

Be it known that I, CHARLES O. WILDER, of Chicago, county of Cook and State of Illinois, have invented certain Improvements in Drop-Hammers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to that class of drop-hammers in which the weight is raised by a crank on a shaft, and then the shaft released to allow the weight to drop on the object below; and the invention consists in certain new and useful devices and combinations of devices, whereby the operation of the hammer is effectually controlled, all as hereinafter more fully set forth.

Figure 1 in the accompanying drawings is a top view of a machine embodying my invention, the parts in position as when the weight has descended. Fig. 2 is a side elevation, the parts in position as when the weight is held elevated by the detent-catch. Fig. 3 is a sectional view of Fig. 1 on the line $x\ x$.

Referring to the parts by letters, letter A represents a frame, to be constructed in any suitable manner, for supporting the working parts. B is the main or driving shaft, suitably journaled in the frame A, and carries the fast pulley $b$, loose pulley $b'$, and spur-pinion $B'$. C is a counter-shaft, also journaled in the frame A, and carrying at one end the lifting-crank D, to which the hammer-strap $d$ is attached in either of the series of holes $d'$, to adjust it to different operations, and to increase or diminish the force of the blow by a greater or lesser elevation of the weight. The hammer or weight is carried on the lower end of the strap $d$, and may be arranged to traverse in upright slides in the ordinary manner. E is a disk carried on the shaft C, and fixed thereon to rotate with it. F is a sleeve arranged to rotate on the counter-shaft C, and held in longitudinal position by one end abutting against the frame A, and its other end against the disk E. G is a ratchet-wheel, attached to the end of the sleeve F, adjacent to the disk E. H is a pinion attached to the sleeve F, and gearing with the spur-pinion $B'$. I is a pawl, affixed rigidly to and carried on one end of a shaft, $i$, which shaft is journaled in and extends through the disk E, and has rigidly attached to its other end a lifter, $I'$. J is a presser-bar, one end pivoted to the disk E, and its other end resting beneath a rearwardly-projecting heel to the lifter $I'$. K is a lug, projecting from the disk E. L is a rod, attached one end midway to the bar J, and, passing through the lug K, is encircled at its other end by a rubber spring, $l$, and has a nut, $l'$, on its end by which it may be adjusted in length to regulate the pressure of the bar J, through the lifter $I'$, upon the pawl I, thereby holding the pawl I engaged with the ratchet G, except when disengaged by the stationary cam M, which extends from the point 2 to the point 3, (see Fig. 3,) and is supported on an annular frame surrounding the shaft C, and attached to the frame A. N is a detent-catch, one end of which is pivoted to a standard, $n$, and its other end held upward to engage with a recess, $e$, in the periphery of the disk E, by means of a rod, $n^1$, rubber spring $n^2$, and lug $n^3$, and nut $n^4$, same as the pressure-regulator for the bar J.

The operation is as follows: A band from any suitable power rotates the pulley $b$ in the direction shown by the arrow at Fig. 1. Supposing the weight to have been lifted, Fig. 1 shows the position of the parts immediately after it has dropped. Simultaneous with the weight striking the object, the lifter $I'$ slides off of the end 3 of the cam-slide M, and allows the pawl I to engage with the ratchet G, by which means motion is transmitted to the disk E and crank D at the instant of the rebound of the weight, and said motion is continued until the lifter $I'$ is raised by the end 2 of the cam M, and the pawl I thereby disengaged from the ratchet G, at which instant the parts will be in the positions shown at Figs. 2 and 3—the pawl disengaged and allowing the pinion H and ratchet G to rotate—while the disk E is held stationary by the detent-catch N. The crank D having passed its upper vertical position, as shown at same figure, the weight will be suspended ready for the blow as soon as the detent N is released by a cord or lever conveniently arranged for said use by the operator. When the detent is released the weight will drop, rotating the disk E, and the cam M will hold up the lifter I', and keep the pawl I disengaged from ratchet G until the lifter reaches the position 3, as hereinbefore described.

It will be evident that by keeping the detent N disengaged from the recess $e$, the operations of the hammer may be made continuous.

The rubber springs $l$ being adjustable, overcome the difficulty common to ordinary steel springs from liability to lose a portion of their elasticity from use.

What I claim as new, and desire to secure by Letters Patent, is—

1. The pawl I, lifter I', disk E, and cam M, arranged to operate with the shaft C, and detent-catch N, substantially as and for the purpose specified.

2. The pawl I and lifter I', when carried on the same shaft, and arranged to operate with disk E, cam M, shaft C, crank D, ratchet G, and pinions H and B, and frame A, substantially as and for the purpose specified.

3. The combination, with the disk E, formed with its notch or recess $e$, of the shaft $i$, lifter I', and pawl I, substantially as herein shown and described.

CHARLES O. WILDER.

Witnesses:
W. B. BOYD,
GEO. SNYDER.